(12) United States Patent
Denecke et al.

(10) Patent No.: US 11,031,612 B2
(45) Date of Patent: Jun. 8, 2021

(54) FUEL CELL SYSTEM HAVING INTEGRATED GAS CONNECTIONS FOR CONNECTION TO AN EXTERNAL TEST GAS SUPPLY

(71) Applicants: AUDI AG, Ingolstadt (DE); VOLKSWAGEN AG, Wolfsburg (DE)

(72) Inventors: Jan Denecke, Braunschweig (DE); Maren Ramona Kirchhoff, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 16/769,198

(22) PCT Filed: Oct. 31, 2018

(86) PCT No.: PCT/EP2018/079787
§ 371 (c)(1),
(2) Date: Jun. 2, 2020

(87) PCT Pub. No.: WO2019/105673
PCT Pub. Date: Jun. 6, 2019

(65) Prior Publication Data
US 2021/0111418 A1 Apr. 15, 2021

(30) Foreign Application Priority Data
Dec. 3, 2017 (DE) .................. 10 2017 221 741.3

(51) Int. Cl.
*H01M 8/04089* (2016.01)
*H01M 8/04082* (2016.01)
*H01M 8/0438* (2016.01)
*H01M 8/04746* (2016.01)
*H01M 8/04664* (2016.01)

(52) U.S. Cl.
CPC ... *H01M 8/04089* (2013.01); *H01M 8/04201* (2013.01); *H01M 8/04388* (2013.01); *H01M 8/04679* (2013.01); *H01M 8/04753* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 2007/0196705 A1 | 8/2007 | Kasahara et al. | |
| 2007/0292726 A1 | 12/2007 | Iida et al. | |
| 2011/0097635 A1* | 4/2011 | Quattrociocchi . | H01M 8/04388 429/428 |

FOREIGN PATENT DOCUMENTS

| | | |
|---|---|---|
| CN | 1934738 A | 3/2007 |
| CN | 101069316 A | 11/2007 |
| DE | 11 2005 003 121 T5 | 10/2007 |
| DE | 10 2007 002 426 A1 | 11/2007 |
| DE | 10 2007 040 837 A1 | 3/2009 |

(Continued)

*Primary Examiner* — Wojciech Haske
(74) *Attorney, Agent, or Firm* — Seed IP Law Group LLP

(57) ABSTRACT

The invention relates to a fuel cell system comprising a shut-off element arranged in each case in a supply path and exhaust path of the anode and/or cathode supply, and comprising a gas connection arranged in each case between a shut-off element and a fuel cell stack for connecting to an external test gas supply. The gas connections allow diagnosis and/or maintenance of the fuel cell stack in the installed state.

9 Claims, 1 Drawing Sheet

(56) References Cited

FOREIGN PATENT DOCUMENTS

| | | |
|---|---|---|
| DE | 10 2013 213 101 A1 | 1/2014 |
| DE | 10 2013 225 792 A1 | 6/2015 |
| DE | 10 2015 008 293 A1 | 12/2016 |
| DE | 10 2015 210 836 A1 | 12/2016 |
| WO | 2006/096956 A1 | 9/2006 |

\* cited by examiner

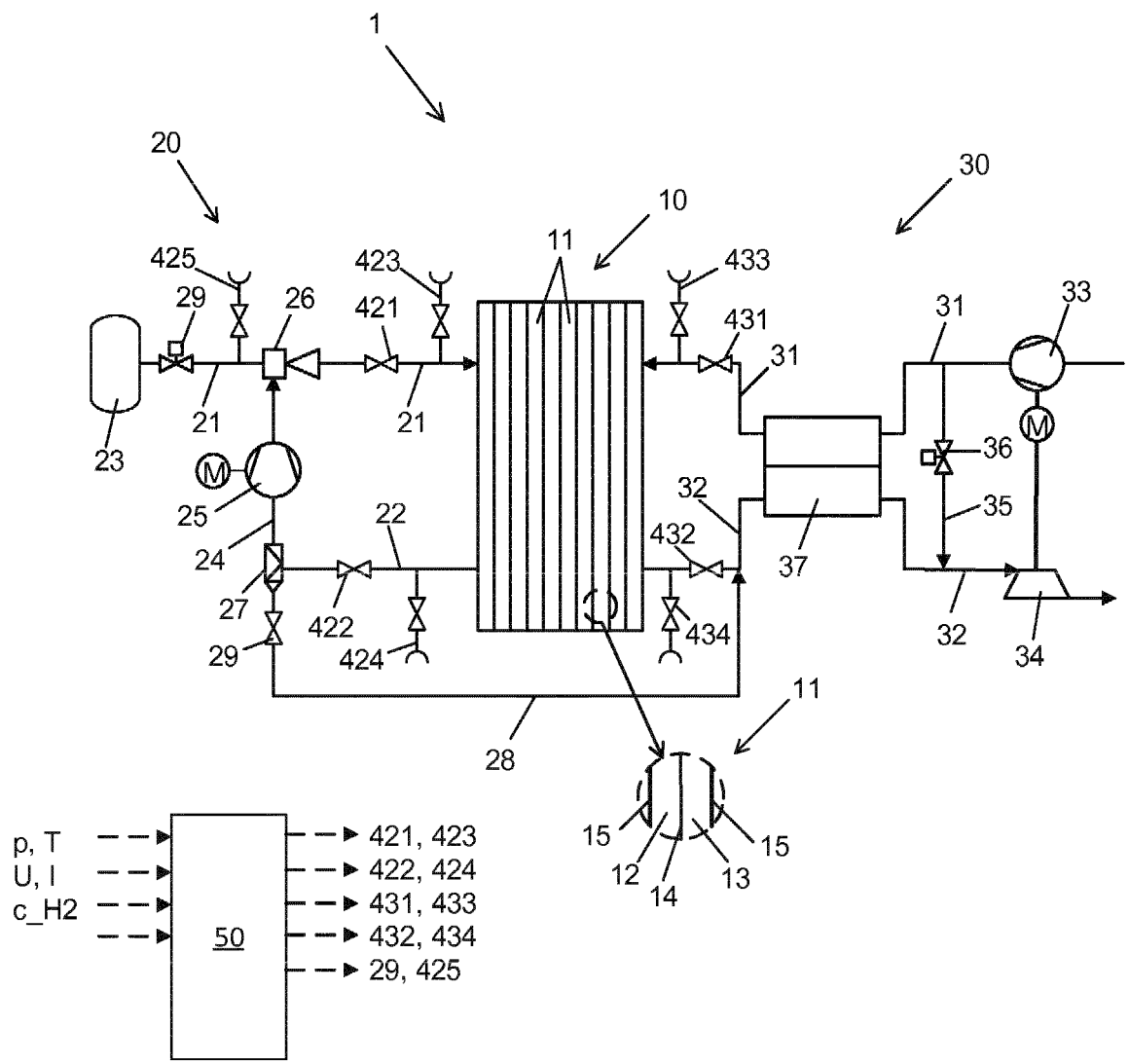

FUEL CELL SYSTEM HAVING INTEGRATED GAS CONNECTIONS FOR CONNECTION TO AN EXTERNAL TEST GAS SUPPLY

BACKGROUND

Technical Field

Embodiments of the invention relate to a fuel cell system which is designed to be connected to an external test gas supply.

Description of the Related Art

Fuel cells use the chemical conversion of a fuel with oxygen into water in order to generate electrical energy. For this purpose, fuel cells contain what is called a membrane electrode assembly (MEA) as a core component, which is an arrangement of an ion-conducting (in most cases, proton-conducting) membrane and a catalytic electrode (anode and cathode) arranged on each side of the membrane. Generally, the fuel cell is formed by a plurality of MEA's arranged in a stack, the electrical power outputs of which add up. Bipolar plates (also called flow-field plates or separator plates) which ensure that individual cells are supplied with the operating media, i.e., the reactants, and are normally also used for cooling, are usually arranged between the individual membrane electrode assemblies. In addition, the bipolar plates also provide electrically-conductive contact with the membrane electrode assemblies.

During operation of the fuel cell, the fuel (anode operating medium)—particularly hydrogen $H_2$ or a gas mixture containing hydrogen—is supplied via an anode-side flow field of the bipolar plate to the anode, where electrochemical oxidation of $H_2$ to protons $H^+$ with loss of electrons takes place ($H_2 \rightarrow 2\ H^+ + 2e^-$). Protons are transported (in a water-bound or water-free manner) from the anode chamber into the cathode chamber across the electrolyte or membrane that separates and electrically insulates the reaction chambers in a gas-tight manner from each other. The electrons provided at the anode are guided to the cathode via an electrical line. For the cathode operating medium, the cathode is supplied with oxygen or a gas mixture containing oxygen (such as air) via a cathode-side flow field of the bipolar plate so that a reduction of $O_2$ to $O^{2-}$ with a gain of electrons takes place ($\frac{1}{2}O_2 + 2e^- \rightarrow O^{2-}$). At the same time, the oxygen anions react in the cathode chamber with the protons transported across the membrane to form water ($O^{2-} + 2H^+ \rightarrow H_2O$).

Fuel cell systems installed in vehicles currently do not have an established diagnostic and maintenance concept. However, the various components of a fuel cell system, such as the fuel cell stacks themselves—here, for example, membranes, electrodes, seals, etc.—are subject to aging effects that make maintenance necessary. Currently, fuel cell systems are removed from the vehicle for maintenance and integrated into a system testing facility, which entails a high expenditure of time and a high level of infrastructure. Moreover, for testing or regeneration of the fuel cell stack itself, e.g., its membrane or electrodes, the stack must, additionally, be removed from the fuel cell system and tested in a stack test facility. This increases the time and infrastructure requirements yet again.

DE 10 2007 002 426 A1 discloses a diagnostic method and a diagnostic apparatus for a fuel cell unit. Here, hydrogen from an external supply and nitrogen are supplied to the fuel cell via a line opening into the air supply line. The diagnostic apparatus performs cyclic voltammetry (CV) to determine the aging of the membrane or electrodes.

DE 10 2013 213 101 A1 discloses a diagnostic device which is electrically connected to the fuel cell stack via diagnostic connectors in order to carry out voltage monitoring.

DE 10 2015 210 836 A1 describes a diagnostic method and device for determining a state of a fuel cell stack. For this purpose, the fuel cell stack is connected to the diagnostic device, defined gas states and/or voltage or current states are applied, and the fuel cell stack data are evaluated.

BRIEF SUMMARY

Embodiments of the present invention provide a fuel cell system which allows diagnosis and/or regeneration of the fuel cell stack with little effort—particularly advantageously in the installed state (on board).

The fuel cell system according to some embodiments of the invention comprises a fuel cell stack; an anode supply having an anode supply path for supplying an anode operating gas to the fuel cell stack and an anode exhaust path for removing an anode exhaust gas therefrom; a cathode supply having a cathode supply path for supplying a cathode operating gas to the fuel cell stack and a cathode exhaust path for removing a cathode exhaust gas therefrom; wherein a shut-off element is arranged in each case in the anode supply path and in, and a gas connection for connecting to an external test gas supply is arranged in each case between the shut-off element and the fuel stack, and/or a shut-off element is arranged in each case in the cathode supply path and in the cathode exhaust path, and a gas connection for connecting to an external test gas supply is arranged in each case between the shut-off element and the fuel cell stack.

According to some embodiments of the invention, a combination of shut-off element and gas connection is thus arranged in each case on the anode side and/or cathode side in the supply and in the exhaust paths. This makes it possible to apply an external gas supply to the fuel cell stack on the anode side or cathode side in order to carry out various diagnosis and/or regeneration actions on the fuel cell stack. In particular, such actions are possible without removing the fuel cell system from the vehicle or the fuel cell stack from the anode and cathode supply of the fuel cell system. The fuel cell system thus has integrated maintenance interfaces which allow easy testing and maintenance of the fuel cell stack.

The shut-off elements can, independently of one another, be any elements which allow interruption of the regular flow path of the operating gases or exhaust gases. For example, valves and flaps are a possibility. Such shut-off elements are often already at least partially present in existing fuel cell systems—for example, in order to regulate the supply of operating gases to the stack or to separate the stack from the environment after it has been shut down.

In each case, the gas connections are arranged between a shut-off element and the stack. Thus, in order to allow connection of an external test gas supply, the shut-off element can be closed, and the connection to the external test gas supply can be established.

Each of the gas connections consists of a fluid-conducting branch of the supply or exhaust paths and can be embodied, for example, as gas-tight T- or Y-pieces. Along with a maintenance line branching off from the supply path or exhaust path, the gas connections can in turn have a shut-off element designed to close the branching maintenance line in a gas-tight manner or to open it to conduct fluid in order to establish the connection with the external test gas supply. Furthermore, the gas connections have a connection piece which enables a gas-tight mechanical connection to a line system of the external gas supply.

In one embodiment of the invention, the gas connections are configured to be self-closing. Hence, mechanical decoupling from the external gas supply leads to automatic closing of the gas connection, and mechanical coupling of the external gas supply to the connection piece of the gas connection leads to automatic opening of the gas connection. The self-closing gas connection thus ensures reliable recognition of correct assembly (similar to a pilot line of an electrical high-voltage system), which ensures that the external gas supply is released only after correct assembly.

In one embodiment of the invention, the gas connections are arranged and designed to be connected to the external test gas supply in a state in which the fuel cell system is installed in a vehicle. In other words, the gas connections are still accessible in the assembled state of the fuel cell system, so that maintenance of the system does not require removal of the fuel cell stack.

In advantageous embodiments, the fuel cell system further comprises a diagnostic module which is configured to control the shut-off elements and gas connections of the anode supply, and/or the shut-off elements and gas connections of the cathode supply. Thus, the diagnostic module can open the shut-off elements, e.g., if it detects correct fitting of the external gas supply to the gas connections. The diagnostic module may further be configured to start, stop, and regulate the external gas supply. In some embodiments, the external gas supply may be integrated into the diagnostic module. For this purpose, the diagnostic module includes, for example, gas tanks, gas lines, conveyors, further shut-off devices and the like.

In a further embodiment, the fuel cell system further comprises a diagnostic module which is configured to carry out a diagnostic function for checking the fuel cell system, a maintenance function for maintenance of the fuel cell system, or a combination of these when a test gas supply is connected to the gas connections of the anode supply and/or a test gas supply is connected to the gas connections of the cathode supply. For this purpose, the diagnostic module may comprise communications interfaces which receive and evaluate electrical and/or thermodynamic state parameters of the fuel cell system and, in particular, of the fuel cell stack. These include, for example, the current intensity of the fuel cell stack, the voltage of the fuel cell stack—which may comprise the total voltage or individual cell voltages—pressure, temperature and the like.

Furthermore, for the purpose of carrying out diagnostic and/or maintenance functions, the diagnostic module may comprise corresponding control and evaluation algorithms in order to carry out the corresponding functions. Characteristic diagrams can also be stored in the diagnostic module in computer-readable form for this purpose.

For example, the diagnostic module can be configured to conduct a leak test of the fuel cell stack, the anode supply, and/or the cathode supply. The leak test makes it possible to detect and evaluate leakages of the system, which can occur, for example, as a result of aging.

Furthermore, the diagnostic module can be configured to perform a diagnostic function to determine the condition of a membrane of the fuel cell stack. In particular, the diagnostic function may include determining a mass flow of molecular hydrogen $H_2$ through the membrane. In this way, holes in the membrane are detected, which can form as a result of drying out, unacceptable voltage values, or extreme thermal stress.

Furthermore, the diagnostic module can be configured to perform a diagnostic function to determine the condition of the catalytic electrodes of the fuel cell stack. This makes it possible to detect aging-related processes which lead to a decrease in the power density. Such processes include, for example, corrosion of the carbon carrier of the catalytic material, agglomeration or washing out of the catalytic precious metal, or deposition of impurities on the catalyst (contamination).

Furthermore, the diagnostic module may be configured to perform a regeneration function to rectify detected reversible damage to the fuel cell stack. It is particularly advantageous that such a regeneration function can seek to restore catalytic activity of catalytic electrodes of the fuel cell stack—for example, by eliminating contamination of the catalytic electrodes.

The various embodiments of the invention mentioned in this application may be combined advantageously with each other unless stated otherwise in individual cases.

BRIEF DESCRIPTION OF THE SEVERAL VIEWS OF THE DRAWINGS

Embodiments of the invention are explained below with reference to the drawing.

FIG. 1 illustrates a block diagram of a fuel cell system according to an embodiment of the invention.

DETAILED DESCRIPTION

FIG. 1 shows a fuel cell system, denoted as a whole by 1. The fuel cell system 1 is part of a vehicle (not shown)—in particular, an electric vehicle—which has an electric traction motor which is supplied with electrical energy by the fuel cell system 1.

The fuel cell system 1 comprises as core components a fuel cell stack 10, which comprises a plurality of individual cells 11 arranged in the form of a stack and which are formed by alternately stacked membrane electrode assemblies (MEA's) 14 and bipolar plates 15 (see detail cutout). Each individual cell 11 thus comprises, in each case, an MEA 14 which has an ion-conducting polymer electrolyte membrane or another solid electrolyte (not shown in detail), as well as catalytic electrodes arranged on both sides thereof, viz., an anode and a cathode, which catalyze the respective partial reaction of the fuel cell conversion and may, in particular, be designed as coatings on the membrane. The anode electrode and cathode electrode have a catalytic material, e.g., platinum, which is supported on an electrically-conductive carrier material with a large specific surface—for example, a carbon-based material. An anode chamber 12 is thus formed between a bipolar plate 15 and the anode, and the cathode chamber 13 is thus formed between the cathode and the next bipolar plate 15. The bipolar plates 15 serve to supply the operating media to the anode and cathode chambers 12, 13 and also establish the electrical connection between the individual fuel cells 11. Gas diffusion layers can optionally be arranged between the membrane electrode assemblies 14 and the bipolar plates 15.

In order to supply the fuel cell stack 10 with the operating media, the fuel cell system 1 comprises, on the one hand, an anode supply 20 and, on the other, a cathode supply 30.

The anode supply 20 comprises an anode supply path 21 which serves to supply an anode operating medium, e.g., hydrogen, to the anode chambers 12 of the fuel cell stack 10. For this purpose, the anode supply path 21 connects a pressure accumulator 23 to an anode inlet of the fuel cell stack 10. The anode operating pressure on the anode sides 12 of the fuel cell stack 10 is adjustable via a pressure control valve 29 in the anode supply path 21. The anode supply 20 also comprises an anode exhaust path 22 which discharges the anode exhaust gas from the anode chambers 12 via an anode outlet of the fuel cell stack 10. Furthermore, the anode supply 20 has a recirculation line 24, which connects the anode exhaust path 22 to the anode supply path 21. The recirculation of fuel is customary, in order to return the mostly over-stoichiometrically supplied fuel to the stack and to use it. Arranged in the recirculation line 24 is a conveyor 25—here, a turbomachine, e.g., a blower or a pump—by which a recirculated volumetric flow rate can be adjusted. Furthermore, a jet pump 26 is arranged at an opening point of the recirculation line 24 into the anode supply path 21. This jet pump is connected to the pressure accumulator 23 on the pressure side, to the recirculation line 24 on the suction side, and to the fuel cell stack 10 on the outlet side. In addition, a water separator 27 is arranged in the anode exhaust path 22, which allows condensed water to be separated. Furthermore, the anode exhaust path 22 is connected to a flushing line 28 which, in the example shown, opens into a cathode exhaust path 32 so that the anode exhaust gas and the cathode exhaust gas can be discharged via a common exhaust system. In an alternative embodiment, the flushing line 28 can also terminate in the environment. A flushing valve 29, which may, alternatively, be combined with the water separator 27, allows the anode exhaust gas to be drained via the flushing line 28.

The cathode supply 30 comprises a cathode supply path 31 which supplies an oxygen-containing cathode operating medium to the cathode chambers 13 of the fuel cell stack 10—in particular, air which is drawn in from the environment. The cathode supply 30 also comprises a cathode exhaust path 32, which discharges the cathode exhaust gas (in particular, the exhaust air) from the cathode chambers 13 of the fuel cell stack 10 and supplies it, if appropriate, to an exhaust system (not shown). A compressor 33 is arranged in the cathode supply path 31 for conveying and compressing the cathode operating medium. In the exemplary embodiment shown, the compressor 33 is designed as a compressor driven mainly by an electric motor, the driving of said compressor being effected via an electric motor. The compressor 33 may also be driven by a turbine 34 (if necessary, with variable turbine geometry), disposed in the cathode exhaust path 32, via a common shaft (not shown).

In the illustrated exemplary embodiment, the cathode supply 30 also has a wastegate line 35 which connects the cathode supply line 31 to the cathode exhaust line 32, i.e., represents a bypass of the fuel cell stack 10. The wastegate line 35 allows excess air mass flow to be conducted past the fuel cell stack 10 without shutting down the compressor 33. A control valve 36 arranged in the wastegate line 35 serves to control the amount of cathode operating medium bypassing the fuel cell stack 10.

The fuel cell system 1 can furthermore have a humidifier 37. The humidifier 37 is arranged in the cathode supply path 31 in such a way that the cathode operating gas and the cathode exhaust gas can flow through it, wherein the cathode operating gas and the cathode exhaust gas are separated from one another by water vapor permeable membranes. Water vapor is transferred from the comparatively moist cathode exhaust gas (exhaust air) to the comparatively dry cathode operating gas (air) via the water vapor permeable membranes.

The fuel cell system 1 further comprises a first shut-off element 421 arranged in the anode supply path 21 between the jet pump 26 and the fuel cell stack 10, which permits interruption of the flow of the anode operating medium between the accumulator 23 and the stack 10. A first gas connection 423 for connecting an external test gas supply is arranged between the shut-off element 421 and the fuel cell stack 10. The gas connection 423 has a maintenance line branching off from the anode supply path 21—for example, in the form of a T- or Y-piece. The maintenance line terminates in a connection piece which provides a fluid-mechanical connection to the external test gas supply. The connection piece is designed, for example, as a quick-release fastener which automatically leads to closure of a further shut-off element arranged in the maintenance line when the external test gas supply is disconnected. Likewise, the connection piece can be designed in such a way that correct assembly of the external test gas supply leads to automatic opening of this shut-off element. Alternatively, although less advantageously, the connection piece can also be designed as a screw connection or the like. Alternatively, or in addition to the first shut-off element 421 and the first gas connection 423, a further gas connection 425 can be arranged downstream of the control valve 29 and upstream of the opening point of the recirculation line 24 into the anode supply path 21. A second shut-off element 422 and a second gas connection 424 arranged between the shut-off element 422 and the fuel cell stack 10 are arranged in the anode exhaust line 22.

Furthermore, in the exemplary embodiment shown, matching pairs of shut-off element and gas connection are also provided in the cathode supply 30. Thus, a third shut-off element 431 is provided in the cathode supply path 31 downstream of the humidifier 37 and upstream of the fuel cell stack 10, and a third gas connection 433 is provided downstream thereof. A fourth shut-off element 432 is arranged in the cathode exhaust path 32 downstream of the stack 10 and upstream of the humidifier 37, and a fourth gas connection 434 is arranged between the fuel cell stack 10 and the shut-off element 432. All the shut-off elements 421, 422, 431, and 432 can be designed as valves or gas flaps. With respect to the design of the gas connections 424, 425, 433, and 434, the statements made for the gas connection 423 apply.

The embodiment shown in FIG. 1 shows an example in which shut-off elements and gas connections are present in each case in both the anode supply 20 and in the cathode supply 30. Depending upon the diagnostic or maintenance function to be carried out, however, embodiments of the invention are also included in which matching shut-off elements and gas connections are present only in the anode supply 20 or only in the cathode supply 30. Furthermore, on the cathode side, instead of the shut-off elements 431, 432 and gas connections 433 and 434, matching shut-off elements and gas connections can also be arranged between the compressor 33 and the humidifier 37 or, in the anode exhaust line 32, between the humidifier 37 and the turbine 34. Such a constellation also allows certain functions of the humidifier 37 to be checked.

The fuel cell system 1 furthermore comprises a diagnostic module 50. On the one hand, the diagnostic module is configured to control the shut-off elements 421, 422, 431, 432, and possibly 29. It is further designed to control the gas connections 423, 424, 433, 434, and, optionally, 425—in particular, their shut-off elements. The diagnostic device further has one or more test gas supplies (not shown) which, in particular, comprise corresponding gas tanks, line systems, and conveyors. Hydrogen $H_2$, nitrogen $N_2$, oxygen $O_2$, air, and/or mixtures of these gases, for example, may be provided as test gases.

Furthermore, the diagnostic module 50 is configured to carry out at least one diagnostic function to check the fuel cell system and/or at least one maintenance function for maintenance of the fuel cell system 1. Some or all of these functions may be integrated into one and the same diagnostic module 50. To perform these functions, the diagnostic module 50 has communications interfaces via which signals from various sensors or measuring devices enter. For example, the diagnostic module may receive signals from pressure or temperature sensors that may be installed in the fuel cell system 1 or in the diagnostic module 50. In addition, the diagnostic module 50 also receives electrical parameters of the fuel cell stack 10—in particular, the generated current intensity I or voltage U—which may be the total voltage of the stack 10 and/or individual cell voltage of the cells 11. Corresponding algorithms and characteristic diagrams for performing the diagnosis and/or maintenance functions are also stored in the diagnostic module 50 for the various functions.

The basic diagnosis and/or regeneration procedure for the system is carried out, for example, in a workshop and is as follows.

When fuel cell system 1 is shut down, connections to an external test gas supply (for example, $H_2$, $N_2$, $O_2$, air, etc.) are connected to the corresponding gas connections 423 (or 425) and 424 of the anode supply 20 and/or to the corresponding gas connections 433 and 434 of the cathode supply 30. If the gas connections are designed appropriately, this leads to automatic opening of the shut-off elements of the gas connections. The diagnostic module 50 may detect correct connection via corresponding sensors. The corresponding shut-off elements 421 (or 29), 422, and/or 432 arranged in the supply and exhaust paths are then closed, unless they have already been closed in the course of shutting down the fuel cell system. Finally, the diagnostic module 50 begins to convey the corresponding test gas or gases in order thus to apply these test gases to the anode chambers 12 and/or cathode chambers 13 of the fuel cell stack 10. Depending upon the function being carried out, the diagnostic module 50 reads in and evaluates the required thermodynamic and/or electrical parameters. After a diagnostic function is performed, a corresponding result of the diagnosis is stored and read out. Various functions of the diagnostic module 50 will be explained in more detail below.

Leak Testing the Anode

To determine leak tightness, it is necessary to provide the fuel cell system 1 with the corresponding shut-off elements 421 (or 29) and 422, as well as the corresponding gas connections 423 (or 425) and 424. After the medium is connected at the gas connections 423 (or 425) and 424, the corresponding shut-off elements of the gas connections are opened, and the shut-off elements 421 (or 29) and 422 are closed, the system is first flushed in order to ensure homogeneous application of the test gas to the system. Then, the test gas is set to a predetermined pressure. In a static variant of the method, further supply of the test gas to the fuel cell stack 10 is then stopped, and the pressure drop over time is registered. In an alternative method, the volumetric flow rate of the test gas into the fuel cell stack is regulated in such a way that a constant pressure is maintained, and the quantity of gas supplied for this is registered. The diagnostic module 50 evaluates this measurement data (pressure drop over time or amount of gas supplied) and generates a test report that is electronically stored and/or read out via a printout or display screen. The evaluation can comprise, for example, comparison of the determined measured value (e.g., pressure drop) to an allowable limit value (factory acceptance test value). If necessary, a typical progress of degeneration can be taken into account here as a function of the age or completed service life of the system.

Leak Testing the Cathode

To measure the equivalent leak tightness of the cathode of the fuel cell stack 10, the gas connections 433 and 434 are connected to a corresponding test gas supply, and the measurement is otherwise carried out as described for the anode. However, the leak tightness of the cathode side of the fuel cell stack 10 is of lesser importance, since any leakages here do not lead to the escape of a hazardous gas.

Checking Hydrogen Concentration Sensors

If the fuel cell system 1 or the vehicle in which it is installed has hydrogen concentration sensors, the diagnostic module 50 can also be equipped with a corresponding function for checking these sensors, which function can, in particular, be carried out in parallel with the leak testing of the anode. Relevant locations for measuring hydrogen are, for example, the flushing line 28 or the exhaust line 32, a stack housing surrounding the fuel cell stack 10 or its exhaust, the engine compartment, the vehicle interior or luggage compartment, or other partially enclosed spaces in which hydrogen can accumulate due to leakage from the $H_2$ system. If the standard is for no $H_2$ sensors to be present at these locations, the measurement can also be facilitated by hand-held measuring devices. The diagnostic module 50 reads in and evaluates the signals from these sensors ($c\_H_2$). This can be done, for example, by applying a plausibility check of the measured value in correlation with the leak tightness measurement. If, for example, a leak is detected in the system, a corresponding $H_2$ sensor should also detect escaped hydrogen if $H_2$ is being used as the test gas. In addition, automatic null measurement of the concentration sensors in the vehicle can also be carried out.

In a further embodiment of the invention, the system can further comprise means by which test gas can be selectively applied to the gas sensors in order to check their function. These means may comprise, for example, corresponding special attachments or adapters on the sensor detection surfaces. Plausibility checking, evaluation, and automatic calibration of the concentration sensors would also be performed by the diagnostic module 50.

Leak Testing the Membrane

Leaks/holes can develop over the lifetime of the polymer electrolyte membrane of the fuel cell stack 10, resulting in an increased $H_2$ crossover through the membrane. This hydrogen flow through the membrane can be detected, for example, by a so-called open cell voltage test (OCV). In this diagnostic step, the external gas supply is connected to both the anode side interfaces 423/425 and 424 and to the cathode side interfaces 433 and 434. The cathode chambers 13 are then automatically filled with air, and the anode chambers 12 with hydrogen. The cell voltage U is monitored and evaluated in terms of a transfer of hydrogen. This can be done, for example, by comparing the measured cell voltage to a stored target voltage. The result of this test is also stored and/or read out.

Electrode Regeneration

The diagnostic module 50 may also have a regeneration function for eliminating contamination of the catalytic electrodes of the fuel cell stack 10. Contaminants, e.g., CO, which have been introduced into the electrodes through the medium transport sections or the medium supply are removed, and precious metal oxides—in particular, platinum oxide—that are formed are eliminated by reduction. In addition, the free catalyst surface, which has been reduced by agglomeration phenomena, can also, in a very general sense, be enlarged.

For this regeneration function, both the anode side and the cathode side external gas connections are connected to the test gas supply. Depending upon the type of damage to the catalytic electrodes of the fuel cell stack 10, specific gas and voltage states of the stack 10 are set in a targeted manner, wherein, in particular, air or oxygen and hydrogen are used as test gases. After the gas connections are connected, the diagnostic module 50 automatically sets defined gas and operating states, which include, for example, air/air state, air/air startup, $H_2/H_2$ state, $H_2/H_2$ startup, wet operation with partial load, wet operation alternating with $H_2/H_2$ state, etc. Conditioning with further gas components, e.g., nitrogen, may also take place.

After a regeneration function is carried out, a performance test, with evaluation and output of a test report, can be done. The evaluation can be carried out, for example, by comparison with a factory acceptance performance test. In this, irreversible or reversible degradation can be assumed, based upon the operating hours or based upon other data recorded and evaluated during driving (e.g., ambient air, based upon route planning/GPS, evaluation of the number of air-air starts, etc.).

In a further development, the effectiveness of the regeneration function or individual steps thereof is analyzed, in order to influence the control process in further driving. In case, for example, of frequent operation in rural areas, leading to increased contamination of the electrodes with ammonia from fertilizers, it can be provided for operating states which lead to spontaneous discharging of this contaminant to be purposely initiated. Such adaptive operation can thus deter the creeping deterioration of the electrodes.

The diagnostic module 50 can, furthermore, receive and evaluate a plurality of data. For example, it can read in data from known diagnostic testers for evaluating error entries, read in and evaluate interventions by vehicle assistance systems, driving profiles, driving routes, environmental conditions, and other driving data relevant to maintenance and diagnosis.

In some embodiments, after the external test gas supply has been connected to the corresponding gas connections, the diagnostic module executes all the implemented diagnostic and regeneration functions in an automated manner.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell system, comprising:
a fuel cell stack;
an anode supply with an anode supply path for supplying an anode operating gas to the fuel cell stack and an anode exhaust path for discharging an anode exhaust from the fuel cell stack;
a cathode supply with a cathode supply path for supplying a cathode operating gas to the fuel cell stack and a cathode exhaust path for discharging a cathode exhaust from the fuel cell stack;
wherein:
a respective anode shut-off element is arranged in each of the anode supply path and the anode exhaust path, and a respective anode gas connection for connecting to an anode external test gas supply is arranged between each anode shut-off element and the fuel cell stack, and/or
a respective cathode shut-off element is arranged in each of the cathode supply path and the cathode exhaust path, and a respective cathode gas connection for connecting to a cathode external test gas supply is arranged between each cathode shut-off element and the fuel cell stack.

2. The fuel cell system according to claim 1, wherein the gas connections are designed to be self-closing.

3. The fuel cell system according to claim 1, wherein the gas connections are arranged and designed to be connected to the respective external test gas supply when the fuel cell system is in an installed state in a vehicle.

4. The fuel cell system according to claim 1, further comprising a diagnostic module configured to control the anode shut-off elements and anode gas connections of the anode supply and/or the cathode shut-off elements and cathode gas connections of the cathode supply.

5. The fuel cell system according to claim 1, further comprising a diagnostic module configured to perform a diagnostic function for checking the fuel cell system and/or a maintenance function for maintenance of the fuel cell system when the anode test gas supply is connected to the anode gas connections of the anode supply and/or when the cathode test gas supply is connected to the cathode gas connections of the cathode supply.

6. The fuel cell system according to claim 5, wherein the diagnostic module is designed to perform a leak test of the fuel cell stack, the anode supply, and/or the cathode supply.

7. The fuel cell system according to claim 5, wherein the diagnostic module is designed to perform a diagnostic function for determining a hydrogen flow through the membrane.

8. The fuel cell system according to claim 5, wherein the diagnostic module is designed to perform a diagnostic function for determining a state of catalytic electrodes of the fuel cell stack.

9. The fuel cell system according to claim 5, wherein the diagnostic module is designed to perform a regeneration function for restoring catalytic activity of catalytic electrodes of the fuel cell stack.

* * * * *